(12) United States Patent
Budhia et al.

(10) Patent No.: US 9,960,607 B2
(45) Date of Patent: May 1, 2018

(54) SYSTEMS, METHODS AND APPARATUS FOR REDUCING INTRA-BASE ARRAY NETWORK COUPLING

(71) Applicant: QUALCOMM Incorporated, San Diego, CA (US)

(72) Inventors: Mickel Bipin Budhia, Auckland (NZ); Nicholas Athol Keeling, Auckland (NZ); Chang-Yu Huang, Auckland (NZ); Jonathan Beaver, Auckland (NZ); Claudio Armando Camasca Ramirez, Auckland (NZ); Michael Le Gallais Kissin, Auckland (NZ)

(73) Assignee: QUALCOMM Incorporated, San Diego, CA (US)

( * ) Notice: Subject to any disclaimer, the term of this patent is extended or adjusted under 35 U.S.C. 154(b) by 525 days.

(21) Appl. No.: 14/584,472

(22) Filed: Dec. 29, 2014

(65) Prior Publication Data

US 2016/0190814 A1 Jun. 30, 2016

(51) Int. Cl.
*H01F 27/42* (2006.01)
*H01F 37/00* (2006.01)
(Continued)

(52) U.S. Cl.
CPC ............ *H02J 5/005* (2013.01); *B60L 11/182* (2013.01); *B60L 11/1831* (2013.01);
(Continued)

(58) Field of Classification Search
CPC .......... H02J 5/005; H02J 7/025; H02J 7/0027; H02J 50/10; H02J 50/40; H01F 38/14; Y02T 10/7055; B60L 11/182
See application file for complete search history.

(56) References Cited

U.S. PATENT DOCUMENTS 5,528,113 A 6/1996 Boys et al.
7,042,411 B2 * 5/2006 Yagi ..................... H01Q 21/24
343/787
(Continued)

FOREIGN PATENT DOCUMENTS

DE 102013101152 A1 8/2014
WO WO-2013019122 A1 2/2013
(Continued)

OTHER PUBLICATIONS

International Search Report and Written Opinion—PCT/US2015/063729—ISA/EPO—Feb. 18, 2016.

*Primary Examiner* — Jared Fureman
*Assistant Examiner* — Esayas Yeshaw
(74) *Attorney, Agent, or Firm* — Knobbe, Martens, Olson & Bear, LLP (57) ABSTRACT

An apparatus for wirelessly transferring power is provided. The apparatus comprises a first coupler, a second coupler, and a third coupler overlapping at least the first coupler. The apparatus further comprises a ferrimagnetic structure comprising a first portion disposed under the first coupler, a second portion disposed under the second coupler, and a gap defined between the first coupler and the second coupler, the gap physically separating the first portion from the second portion. One or both of the first portion and the second portion comprises a first plurality of ferrimagnetic strips interleaved with a second plurality of ferrimagnetic strips configured to attenuate a magnetic flux passing between the first and second couplers. The first plurality of ferrimagnetic strips are interleaved with the second plurality of ferrimagnetic strips under at least a portion of the first coupler that is overlapped by the third coupler.

30 Claims, 8 Drawing Sheets

(51) Int. Cl.
  *H01F 38/00* (2006.01)
  *H02J 5/00* (2016.01)
  *H02J 7/02* (2016.01)
  *H01F 38/14* (2006.01)
  *B60L 11/18* (2006.01)
  *H02J 7/00* (2006.01)
  *H02J 50/40* (2016.01)
  *H01F 27/36* (2006.01)
  *H02J 50/10* (2016.01)

(52) U.S. Cl.
  CPC ........ *B60L 11/1837* (2013.01); *H01F 27/365* (2013.01); *H01F 38/14* (2013.01); *H02J 7/0027* (2013.01); *H02J 7/025* (2013.01); *H02J 50/40* (2016.02); *H02J 50/10* (2016.02); *Y02T 10/7005* (2013.01); *Y02T 10/7055* (2013.01); *Y02T 10/7072* (2013.01); *Y02T 90/121* (2013.01); *Y02T 90/122* (2013.01); *Y02T 90/125* (2013.01); *Y02T 90/128* (2013.01); *Y02T 90/14* (2013.01)

(56) References Cited

U.S. PATENT DOCUMENTS

| | | | |
|---|---|---|---|
| 8,937,408 B2 * | 1/2015 | Ganem | H02J 5/005 307/104 |
| 8,941,268 B2 * | 1/2015 | Suzuki | H02J 5/005 307/104 |
| 2009/0160262 A1 * | 6/2009 | Schmidt | H01F 27/2847 307/104 |
| 2010/0259217 A1 * | 10/2010 | Baarman | H02J 5/005 320/108 |
| 2011/0127951 A1 * | 6/2011 | Walley | H02J 7/025 320/108 |
| 2012/0025602 A1 * | 2/2012 | Boys | H02J 5/005 307/9.1 |
| 2012/0098349 A1 * | 4/2012 | Kim | H04B 5/0037 307/104 |
| 2012/0161530 A1 * | 6/2012 | Urano | H02J 7/025 307/104 |
| 2012/0217111 A1 | 8/2012 | Boys et al. | |
| 2014/0361630 A1 * | 12/2014 | Boys | H01F 27/365 307/104 |
| 2016/0099576 A1 * | 4/2016 | Ho | H02J 7/025 320/108 |

FOREIGN PATENT DOCUMENTS

| | | |
|---|---|---|
| WO | WO-2013019124 A1 | 2/2013 |
| WO | WO-2013036146 A1 | 3/2013 |
| WO | WO-2013122483 A1 | 8/2013 |

* cited by examiner

SYSTEMS, METHODS AND APPARATUS FOR REDUCING INTRA-BASE ARRAY NETWORK COUPLING

FIELD

This application is generally related to wireless power charging of chargeable devices such as electric vehicles, and more specifically to systems, methods and apparatuses for reducing intra-base array network coupling.

BACKGROUND

Semiconductor switches may be placed in series with couplers (e.g., couplers) of a Base Array Network (BAN) in order to activate or deactivate a coupler. Non-overlapping couplers in a BAN may have unwanted, relatively high mutual coupling, which may cause a large induced voltage to appear across a switch of a deactivated coupler while an adjacent coupler is driven. This high induced voltage may damage the switch. Consequently, more expensive switches having higher-voltage ratings may be required to prevent damage. Accordingly, systems, methods and apparatuses for reducing intra-base array network coupling are desirable.

SUMMARY

According to some implementations, an apparatus for wirelessly transferring power is provided. The apparatus comprises a first coupler. The apparatus comprises a second coupler adjacent to and not overlapping the first coupler. The apparatus comprises a third coupler overlapping at least the first coupler. The apparatus comprises a ferrimagnetic structure comprising a first portion disposed under the first coupler, a second portion disposed under the second coupler, and a gap defined between the first coupler and the second coupler physically separating the first portion from the second portion.

In some other implementations, a method for wirelessly transferring power is provided. The method comprises transferring power wirelessly to a wireless power receiver via at least one of a first coupler, a second coupler, and a third coupler overlapping at least the first coupler in conjunction with a ferrimagnetic structure comprising a first portion disposed under the first coupler, a second portion disposed under the second coupler, and a gap defined between the first coupler and the second coupler, the gap physically separating the first portion from the second portion.

In yet some other implementations a non-transitory computer-readable medium is provided. The medium comprises code that, when executed, causes an apparatus to transfer power wirelessly to a wireless power receiver via at least one of a first coupler, a second coupler, and a third coupler overlapping at least the first coupler in conjunction with a ferrimagnetic structure comprising a first portion disposed under the first coupler, a second portion disposed under the second coupler, and a gap defined between the first coupler and the second coupler, the gap physically separating the first portion from the second portion.

In yet some other implementations, an apparatus for wirelessly transferring power is provided. The apparatus comprises first means for wirelessly transferring power to a wireless power receiver. The apparatus comprises second means for wirelessly transferring power to the wireless power receiver. The apparatus comprises third means for wirelessly transferring power to the wireless power receiver, the third means overlapping at least the first means. The apparatus comprises means for channeling magnetic flux comprising a first portion disposed under the first means, a second portion disposed under the second means, and a gap defined between the first means and the second means, the gap physically separating the first portion from the second portion.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

In the following detailed description, reference is made to the accompanying drawings, which form a part of the present disclosure. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive coupler" to achieve power transfer.

An electric vehicle is used herein to describe a remote system, an example of which is a vehicle that includes, as part of its motion capabilities, electrical power derived from a chargeable energy storage device (e.g., one or more rechargeable electrochemical cells or other type of battery). As non-limiting examples, some electric vehicles may be hybrid electric vehicles that include a traditional combustion engine for direct locomotion or for charging the vehicle's battery in addition to electric motors. Other electric vehicles may draw all locomotive ability from electrical power. The electric vehicle is not limited to an automobile and may include motorcycles, carts, scooters, and the like. By way of example and not limitation, a remote system is described herein in the form of the electric vehicle (EV). Furthermore, other remote systems that may be at least partially powered using a chargeable energy storage device are also contemplated (e.g., electronic devices such as personal computing devices and the like).

The terminology used herein is for the purpose of describing particular implementations only and is not intended to be limiting of the disclosure. It will be understood that if a specific number of a claim element is intended, such intent will be explicitly recited in the claim, and in the absence of such recitation, no such intent is present. For example, as used herein, the singular forms "a", "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Figure 1:
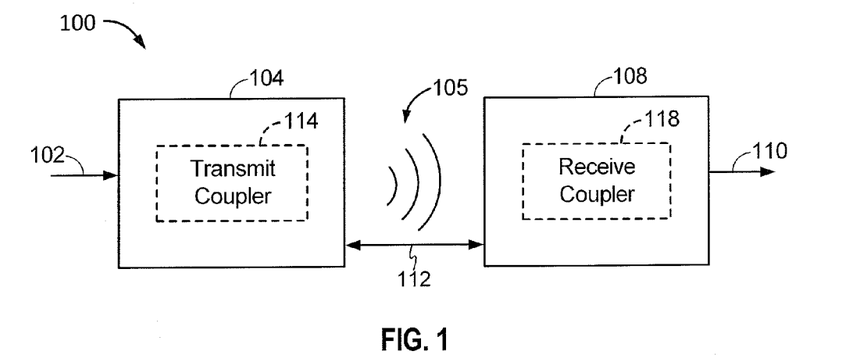
FIG. 1 is a functional block diagram of a wireless power transfer system, in accordance with an exemplary implementation.

FIG. 1 is a functional block diagram of a wireless power transfer system 100, in accordance with an exemplary implementation. An input power 102 may be provided to a transmitter 104 from a power source (not shown) to generate a time varying wireless (e.g., magnetic or electromagnetic) field 105 with a frequency corresponding to the resonant frequency of the transmit coupler 114 for performing energy transfer. A receiver 108 may couple to the wireless field 105 and generate an output power 110 for storing or consumption by a device (not shown in this figure) coupled to the output power 110. Both the transmitter 104 and the receiver 108 are separated by a distance 112.

In one example implementation, the transmitter 104 and the receiver 108 are configured according to a mutual resonant relationship. When the resonant frequency of the receiver 108 and the resonant frequency of the transmitter 104 are substantially the same or very close, transmission losses between the transmitter 104 and the receiver 108 are minimal. However, even when resonance between the transmitter 104 and receiver 108 are not matched, energy may be transferred, although the efficiency may be affected. For example, the efficiency may be less when resonance is not matched. Transfer of energy occurs by coupling energy from the wireless field 105 of the transmit coupler 114 to the receive coupler 118, residing in the vicinity of the wireless field 105, rather than propagating the energy from the transmit coupler 114 into free space.

As such, wireless power transfer may be provided over a larger distance in contrast to purely inductive solutions that may require large couplers which are very close (e.g., within millimeters). Resonant inductive coupling techniques may thus allow for improved efficiency and power transfer over various distances and with a variety of inductive coupler configurations.

The receiver 108 may receive power when the receiver 108 is located in the wireless field 105 produced by the transmitter 104. The wireless field 105 corresponds to a region where energy output by the transmitter 104 may be captured by the receiver 108. The wireless field 105 may correspond to the "near-field" of the transmitter 104 as will be further described below. The transmitter 104 may include a transmit coupler 114 for coupling energy to the receiver 108. The receiver 108 may include a receive coupler 118 for receiving or capturing energy transmitted from the transmitter 104. The near-field may correspond to a region in which there are strong reactive fields resulting from the currents and charges in the transmit coupler 114 that minimally radiate power away from the transmit coupler 114. The near-field may correspond to a region that is within about one wavelength (or a fraction thereof) of the transmit coupler 114.

As described above, efficient energy transfer may occur by coupling a large portion of the energy in the wireless field 105 to the receive coupler 118 rather than propagating most of the energy in an electromagnetic wave to the far field. When positioned within the wireless field 105, a "coupling mode" may be developed between the transmit coupler 114 and the receive coupler 118. The area around the transmit coupler 114 and the receive coupler 118 where this coupling may occur is referred to herein as a coupling-mode region.

Figure 2:
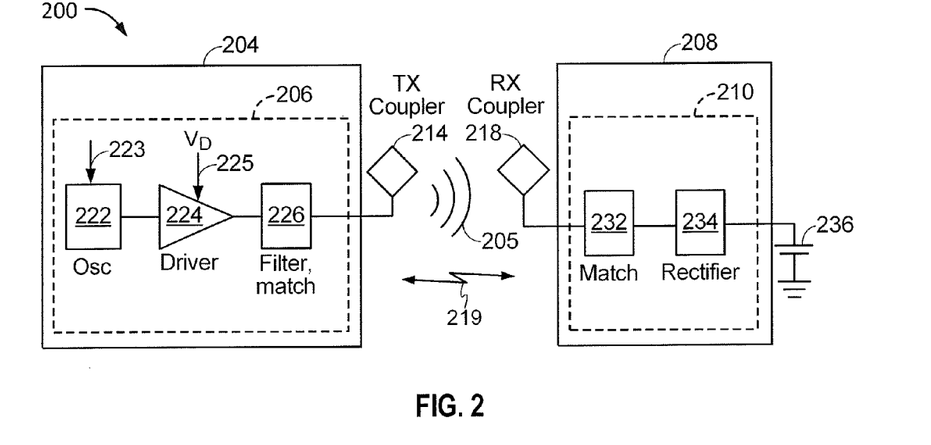
FIG. 2 is a functional block diagram of a wireless power transfer system, in accordance with another exemplary implementation.

FIG. 2 is a functional block diagram of a wireless power transfer system 200, in accordance with another exemplary implementation. The system 200 may be a wireless power transfer system of similar operation and functionality as the system 100 of FIG. 1. However, the system 200 provides additional details regarding the components of the wireless power transfer system 200 as compared to FIG. 1. The system 200 includes a transmitter 204 and a receiver 208. The transmitter 204 may include a transmit circuitry 206 that may include an oscillator 222, a driver circuit 224, and a filter and matching circuit 226. The oscillator 222 may be configured to generate a signal at a desired frequency that may be adjusted in response to a frequency control signal 223. The oscillator 222 may provide the oscillator signal to the driver circuit 224. The driver circuit 224 may be configured to drive the transmit coupler 214 at a resonant frequency of the transmit coupler 214 based on an input voltage signal ($V_D$) 225.

The filter and matching circuit 226 may filter out harmonics or other unwanted frequencies and match the impedance of the transmitter 204 to the transmit coupler 214. As a result of driving the transmit coupler 214, the transmit coupler 214 may generate a wireless field 205 to wirelessly output power at a level sufficient for charging a battery 236 of the electric vehicle 605, for example.

The receiver 208 may include a receive circuitry 210 that may include a matching circuit 232 and a rectifier circuit 234. The matching circuit 232 may match the impedance of the receive circuitry 210 to the receive coupler 218. The rectifier circuit 234 may generate a direct current (DC) power output from an alternate current (AC) power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205. In some implementations, the receiver 208 may be configured to determine whether an amount of power transmitted by the transmitter 204 and received by the receiver 208 is appropriate for charging the battery 236.

Figure 3:
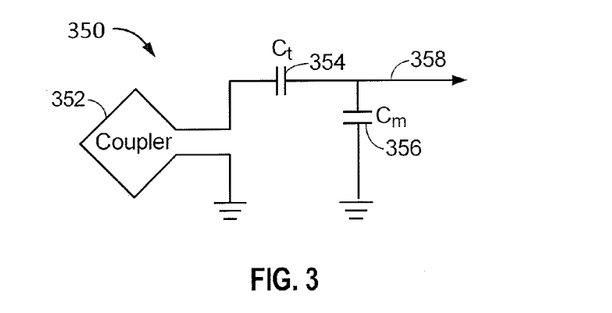
FIG. 3 is a schematic diagram of a portion of transmit circuitry or receive circuitry of FIG. 2 including a transmit or receive coupler, in accordance with an exemplary implementation.

FIG. 3 is a schematic diagram of a portion of the transmit circuitry 206 or the receive circuitry 210 of FIG. 2, in accordance with some exemplary implementations. As illustrated in FIG. 3, a transmit or receive circuitry 350 may include a coupler 352. The coupler 352 may also be referred to or be configured as a "conductor loop" 352 or as a "magnetic" coupler. The term "coupler" generally refers to a component that may wirelessly output or receive energy for coupling to another "coupler."

The resonant frequency of the loop or magnetic couplers is based on the inductance and capacitance of the loop or magnetic coupler. Inductance may be simply the inductance created by the coupler 352, whereas, capacitance may be added to the coupler's inductance to create a resonant structure at a desired resonant frequency. As a non-limiting example, a capacitor 354 and a capacitor 356 may be added to the transmit or receive circuitry 350 to create a resonant circuit that selects a signal 358 at a resonant frequency. Accordingly, for larger sized couplers using large diameter couplers exhibiting larger inductance, the value of capacitance needed to produce resonance may be lower. Furthermore, as the size of the coupler increases, coupling efficiency may increase. This is mainly true if the size of both base and electric vehicle couplers increase. For transmit couplers, the signal 358, with a frequency that substantially corresponds to the resonant frequency of the coupler 352, may be an input to the coupler 352.

Many current wireless vehicle charging systems require the electric vehicle being charged to be stationary, i.e., stopped near or above the base coupler such that the electric vehicle maintains presence within the wireless field generated by the base coupler. Thus, while the electric vehicle is being charged by such a wireless charging system, the electric vehicle may not be used for transportation. Dynamic wireless charging systems that are capable of transferring power across free space may overcome some of the deficiencies of stationary wireless charging stations.

For example, the electric vehicle may travel along a roadway having a dynamic wireless charging system. The dynamic wireless charging system may comprise a plurality of the base couplers placed linearly along a path of travel. The electric vehicle may request the dynamic wireless charging system activate the base couplers along the electric vehicle's path of travel. Such dynamic charging may also serve to reduce or eliminate the need for auxiliary or supplemental motor systems in addition to the electric locomotion system of the electric vehicle (e.g., a secondary gasoline engine of the hybrid/electric vehicle).

Figure 4:
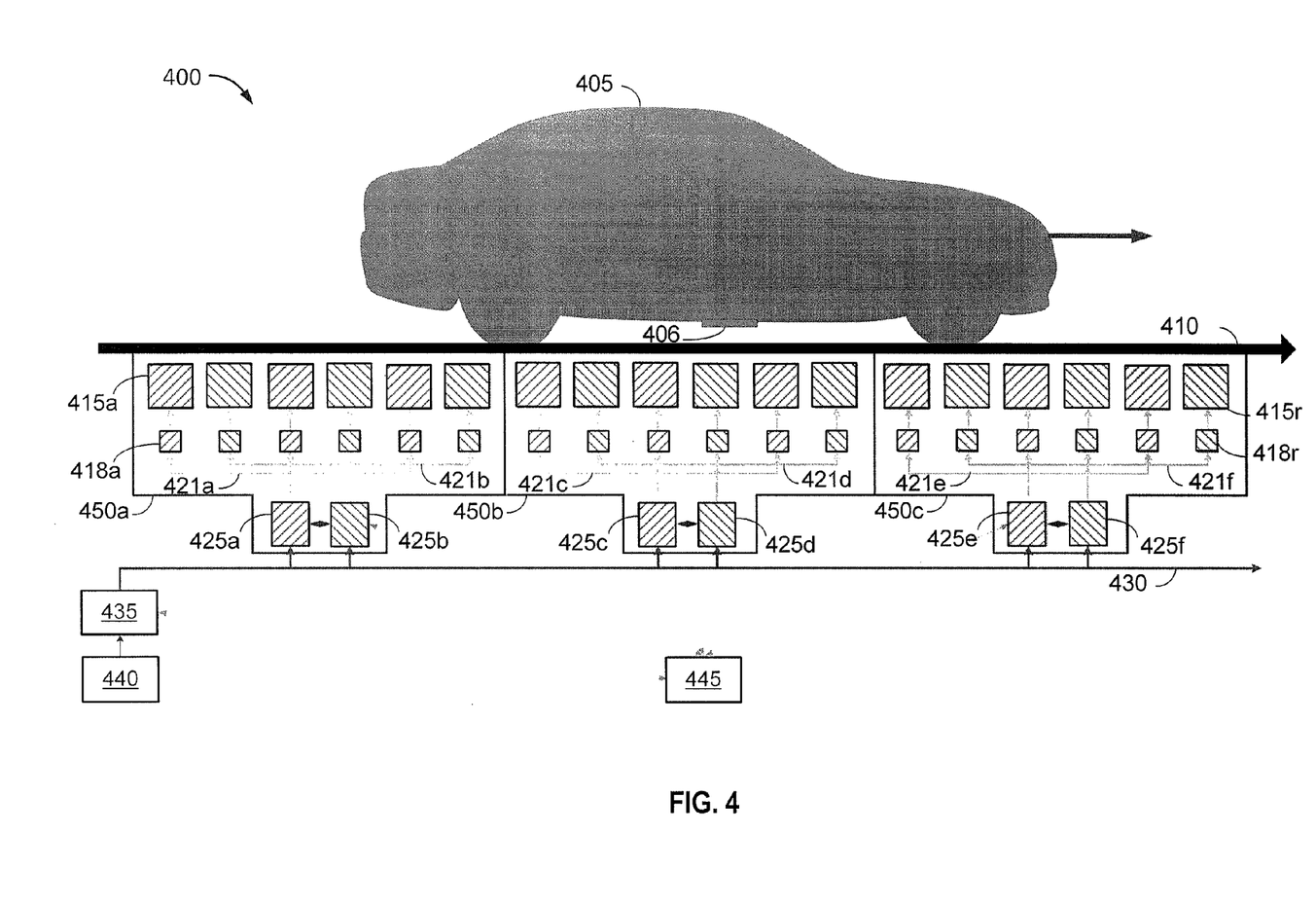
FIG. 4 illustrates a functional block diagram of an electric vehicle with at least one vehicle coupler in the presence of a wireless power transfer system, in accordance with an exemplary implementation.

FIG. 4 illustrates a functional block diagram of an electric vehicle 405 with at least one vehicle coupler 406 in the presence of a wireless power transfer system 400, in accordance with an exemplary implementation. As shown in FIG. 4, various components of a distribution network of a wireless power transfer system 400 are installed beneath, along or beside a roadway 410. The roadway 410 extends from the left side of FIG. 4 to the right side of FIG. 4, with a direction of travel of the electric vehicle 405 aligned with the roadway 410. The electric vehicle 405 may comprise at least one vehicle coupler 406, similar to the receivers 108/208, as previously described in connection with FIGS. 1 and 2, respectively. In some implementations, the at least one vehicle coupler 406 may comprise a polarized coupling system (e.g., a double-D coupler), a quadrature coupler system, combined double-D quadrature coupler system, or any other system utilizing any other type or shape of coupler (e.g., bipolar, circular, rectangular, or solenoid shaped couplers). A vehicle coupler 406 (secondary coupler) may couple with the magnetic field emitted by the primary coupler to receive flux. In some implementations, the vehicle coupler 406 (secondary coupler) may be selected to compliment the primary coupler(s) so as to couple with as much of the magnetic field to maximize the received flux. If the primary coupler is producing polarized (i.e., horizontal) flux, then a polarized type of vehicle coupler 406 may be used in the coupling system (e.g., a double-D coupler or a solenoid); alternatively, if the primary coupler is producing vertical flux, then a circular coupler or a quadrature coupler may be used. If the primary coupler is producing a combination of horizontal and vertical flux, then a combination vehicle coupler 406 may be used, e.g., a DDQ coupler. The "double-D" may refer to placing two D-shaped couplers back to back such that the overall shape of the coupler is round. A quadrature coupler may use four couplers as opposed to only two, in various geometries.

The dynamic wireless charging system 400 may comprise a plurality of base couplers 415a-415r installed in, on, beside, or flush with the roadway 410. Each of the plurality of base couplers 415a-415r may be configured to generate a wireless field (see the wireless field 205 of FIG. 2) for wirelessly transferring power to the electric vehicle 405 via the at least one vehicle coupler 406 when activated. Each of a plurality of switches 418a-418r may be configured to operationally connect a respective one of the base couplers 415a-415r to one of a plurality of local controllers 425a-425f via one of a plurality of distribution circuits 421a-421f. The local controllers 425a-425f may be configured to wirelessly receive power from a power supply/inverter 435, via an alternating current (AC) power backbone 430, and control an amount of power transferred to one or more of the plurality of base couplers 415a-415f via the switches 418a-418r. The power supply/inverter 435 may receive its power from a power source 440. The power source 440 and/or the power supply/inverter 435 may be sized based on a number of base couplers 415 to power, a number of local controllers 425, and/or a number and type of electric vehicles 405 to be charged. The power source 440 and power supply/inverter 435 may provide current at a frequency utilized by the base couplers 415 or, alternatively, at some higher or lower frequency. The AC power backbone 430 may comprise a loop conductor that distributes the high frequency (HF) power and may be capable of synchronizing the base couplers 415 and/or the local controllers 425 that are near each other to a single phase. Thus, the AC power backbone 430 may be considered a phase reference that also distributes power.

A distribution controller 445 may be in communication with the power supply/inverter 435 and the local controllers 425a-425f and may be configured to provide global coordination of power control between the local controllers 425a-425f Groups of the base couplers 415, the switches 418, and the local controllers 425 may comprise a series of individual Base Array Network (BAN) modules 450a-450c. The respective components of the BAN modules 450 are shaded to indicate respective common current paths.

As the electric vehicle 405 travels along the roadway 410, the distribution controller 445 may communicate with one or more of the electric vehicle 405, the power supply/inverter 435, and the local controllers 425a-425f to coordinate activation or deactivation of particular ones of the base couplers 415a-415r. For example, the distribution controller 445 may command the power supply/inverter 435 to generate a current and distribute the current to the AC power backbone 430. The AC power backbone 430 may utilize the distributed current to wirelessly supply power to the local controllers 425a-425f via a "double couple transformer" that wirelessly couples energy from the AC power backbone 430 and wirelessly couples energy to each of the respectively connected local controllers 425a-425f.

The local controllers 425a-425f may receive the power from the AC power backbone 430 and provide a regulated amount of current to one or more of the base couplers 415a-415r. In some implementations, the local controllers 425 in each BAN module 450 may comprise individual control units capable of independent control from each other. Alternatively, the local controllers 425 of each BAN module 450 may comprise a single, shared control unit or processor. The base couplers 415a-415r may generate wireless fields according to the current received via the respective switch 418a-418r from the local controller 425a-425f and may couple to the at least one vehicle coupler 406 to wirelessly transfer power to the electric vehicle 405.

Depending on the particular implementation, control of activation of the base couplers 415 may be shared to differing degrees between the distribution controller 445 and the local controllers 425a-425f. For example, in some implementations, the distribution controller 445 may coordinate the activation and deactivation of the base couplers 415a-415r and may coordinate any communications or actions between multiple BAN modules 450a-450c. In some other implementations, the distribution controller 445 may simply coordinate communications between the BAN modules 450a-450c or local controllers 425a-425f, while the local controllers 425a-425f may control the base coupler sequencing. In yet other implementations, the distribution controller 445 may activate a particular BAN module 450a-450c, but leave timing of the base coupler activations to the associate local controller(s) 425a-425f. In yet other implementations, the distribution controller 445 may communicate only non-critical information to the local controllers 425a-425f and not provide base coupler activation information.

Higher level coordination by the distribution controller 445, combined with the more localized current distribution and regulation at the local controllers 425a-425f may create a more responsive dynamic wireless charging system 400 with decentralized control via the local controllers 425a-425f. This may allow the local controllers 425a-425f to control current flow independently of the distribution controller 445 and allow local control of impedance matching and reactive voltage/amperage (VAr) loading. Such localized control may provide a decreased VAr load compensation response time since instructions need only come from the local controller 425a-425f and not from the distribution controller 445.

The distribution controller 445 may also obtain information regarding the velocity of the electric vehicle 405 for controlling activation of particular ones of the base couplers 415a-415r. The distribution controller 445 may obtain this information from the electric vehicle 405 or from various sensors or load analysis of the base couplers 415a-415r. In other implementations, each of the BAN modules 450a-450c may sense the presence of the electric vehicle 405 and autonomously and selectively activate the appropriate base couplers 415a-415r according to a detected presence or location of the electric vehicle 405. In yet other implementations, the BAN modules 450a-450c may receive a signal comprising information regarding the electric vehicle 405 velocity and/or position or an activation command from a neighboring BAN module. The received signal may come directly from the neighboring BAN module (e.g., a corresponding local controller 425) or via the distribution controller 445.

When a respective local controller 425 receives a signal from the distribution controller 445 to activate a specific base coupler 415, the respective local controller 425 may activate the switch 418 corresponding to the specific base coupler 415. As the vehicle 405 continues in the direction of travel, the local controllers 425a-425f may receive commands from the distribution controller 445 to activate or deactivate specific base couplers 415a-415r based on the position of the vehicle coupler 406. The local controllers 425a-425f may further control or regulate the current from the AC power backbone 430.

As depicted, the base couplers 415 from consecutive local controllers 425 may be interleaved or interlaced such that a single local controller 425 may provide power to alternating base couplers 415. Thus, the base couplers 415 from a first local controller 425 may be proximally interleaved with the base couplers 415 controlled by a second local controller 425 when the two local controllers 425 are within the same BAN 450. Thus, alternating base couplers 415 may be powered by different local controllers 425 and one local controller need not simultaneously power two adjacent base couplers 415. Additionally, preventing a single local controller 425 from providing current to consecutive or adjacent base couplers 415 may reduce power rating requirements of individual components, as each component need only be capable of handling the current load of a single base coupler 415 at a given time.

A wireless power transfer system having unbalanced reactive power loading may be able to transfer less power than a system having a balanced reactive power loading between the power source (e.g. the AC power backbone 430) and the load, or receiver (e.g., the base couplers 415). For example, unbalanced reactive power may result in thermal losses, voltage differences between the source and sink, and a decrease in voltage stability, among other factors. Accordingly, in some implementations, the local controllers 425a-425f may each comprise a tuning circuit or network to tune the current, and consequently the power, available to currently activated base coupler(s) 415. Such tuning circuits may allow for maintaining an optimum, or balanced VAr of the wireless charging system 400 within a small range (e.g., +/−5%) of the designed power tuning value.

In an exemplary dynamic wireless charging system, there may be a number of factors that impact the power supply tuning network. Certain systems may suffer from tuning capacitor aging. As a capacitor ages, the capacitive characteristics of the component may diminish. In an implementation, the AC power backbone 430 may vary in length, affecting the overall VAr loading of the system. In an implementation, various vehicle tuning topologies may affect the AC power backbone 430 VAr loading in different ways, reflecting different amounts of reactive power load back to the AC power backbone 430 (e.g., based on the vehicle charging system design).

In an implementation, the tuning circuit or network may be configured to function with only one base coupler 415 activated. In another implementation, the tuning circuit or network may be configured to function with multiple base couplers 415 being activated or be applied to one or more of the BANs 450a-450c. In another implementation, the tuning circuit or network may be configured to function with a single base coupler 415 or with multiple base couplers 415 being activated and receiving a current from a respective local controller 425.

Figure 5:
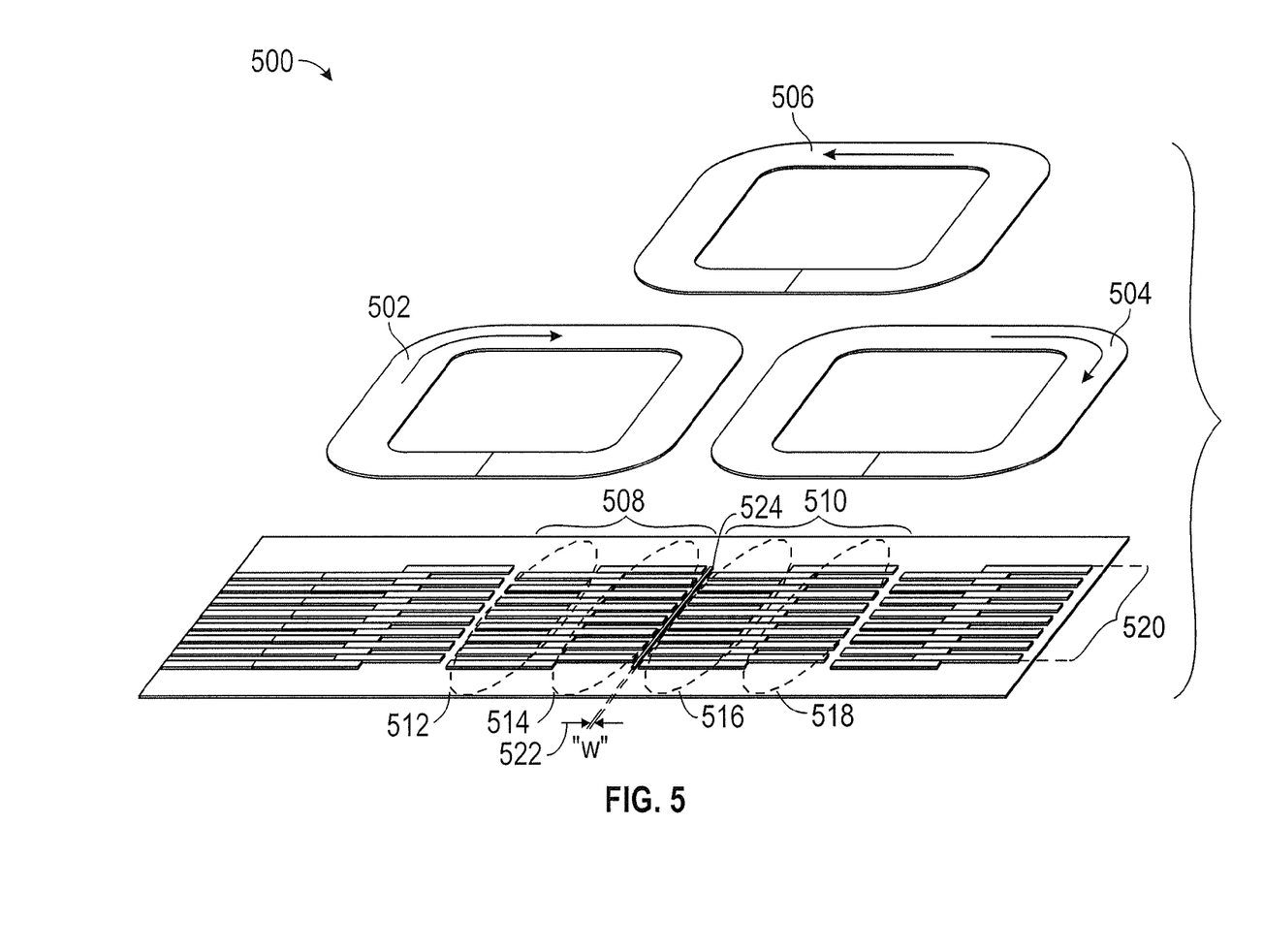
FIG. 5 shows a base array network (BAN) for transmitting power wirelessly, in accordance with an exemplary implementation.

FIG. 5 shows a base array network (BAN) 500 for transmitting power wirelessly, in accordance with an exemplary implementation. The BAN 500 may correspond to any of the BANs 450a-450c, as previously described in connection with FIG. 4. The BAN 500 may comprise a first coupler 502 and a second coupler 504 adjacent to but not overlapping the first coupler 502. In some implementations, the first coupler 502 and the second coupler 504 may comprise a "double D" arrangement, as previously described. The BAN 500 additionally comprises a third coupler 506 overlapping at least a portion of the first coupler 502, although FIG. 5 shows the third coupler 506 also overlapping at least a portion of the second coupler 504. In some implementations, the third coupler 506 may be positioned to be mutually decoupled from each of the first and second couplers 502/504. Thus, in some implementations, current may be driven in each of the first, second and third couplers 502/504/506 at appropriate respective times with relative polarities as shown by the arrows in FIG. 5. In addition, in some implementations, it is desirable to further attenuate, decrease or substantially eliminate any mutual coupling between the first and second couplers 502/504, since the first and second couplers 502/504 are not necessarily driven simultaneously and any coupling to an un-driven coupler by a driven coupler may induce a voltage across the open terminals of any switch connected across the terminals of the un-driven coupler.

However, in order to further reduce any mutual coupling between the first and second couplers 502/504, a specially designed ferrimagnetic structure 520 may be disposed beneath or adjacent to the first and second couplers 502/504 in order to reduce a flow of magnetic flux between the first portion 508 and the second portion 510 of the ferrimagnetic structure 520. Stated another way, the ferrimagnetic structure 520 is configured to channel magnetic flux in order to adjust, manipulate or control a mutual coupling between the first coupler 502 and the second coupler 504. The ferrimagnetic structure 520 may include a first portion 508 disposed substantially under the first coupler 502 and a second portion 510 disposed substantially under the second coupler 504. As shown in FIG. 5, a gap 522 may be defined in the ferrimagnetic structure 520 between the first coupler 502 and the second coupler 504 (e.g., physically separating the first portion 508 from the second portion 510 of the ferrimagnetic structure 520). The gap 522 may have a width "w."

As shown in FIG. 5, each of the first 508 and second 510 portions of the ferrimagnetic structure 520 may comprise a first plurality of ferrimagnetic strips (e.g., the first plurality 512 within the first portion 508 and the first plurality 516 within the second portion 510) interleaved with a second plurality of ferrimagnetic strips (e.g., the second plurality 514 within the first portion 508 and the second plurality 518 within the second portion 510). The first plurality of ferrimagnetic strips 512 are interleaved with the second plurality of ferrimagnetic strips 514 under at least a portion of the first coupler 502 that is overlapped by the third coupler 506. Likewise, FIG. 5 shows the first plurality of ferrimagnetic strips 516 are interleaved with the second plurality of ferrimagnetic strips 518 under at least a portion of the second coupler 504 that is overlapped by the third coupler 506. Thus, magnetic flux may freely travel through the first and second pluralities of ferrimagnetic strips 512/514 of the first portion 508 as well as through the first and second pluralities of ferrimagnetic strips 516/518 of the second portion 510.

In addition, the ferrimagnetic strips of the first portion (e.g., the ferrimagnetic strips 514) may be offset from the ferrimagnetic strips of the second portion (e.g., the ferrimagnetic strips 516) in a direction substantially perpendicular to the width "w" of the gap 522. This has the effect of maximizing a distance between any ferrimagnetic strip of the first portion 508 and any ferrimagnetic strip of the second portion 510, which maximizes the distance the flux has to travel between ferrite strips at the gap 522. By this mechanism, the gap 522 in the ferrimagnetic structure 520 reduces an amount of magnetic flux passing between the first and second portions 508 and 510 and so reduces a level of mutual coupling between the first coupler 502 and the second coupler 504. For example, an exemplary measured mutual coupling coefficient ("k") between the first coupler 502 and the second coupler 504 may be reduced from approximately 0.18 (where solid ferrite strips with no gaps in the ferrimagnetic structure 520 are utilized) to approximately 0.10 (where interleaved ferrite strips with the gap 522 is utilized as described above), e.g., approximately a 44% reduction in mutual coupling. Moreover, in addition to reducing the flow of magnetic flux between the first and second portions 508 and 510, the interleaved ferrite strips of the first and second portions 508 and 510 may provide a more uniform magnetic flux density throughout the ferrimagnetic structure 520 than if the ferrite strips formed a single, un-gapped, tightly packed structure. This interleaved ferrite strip structure further provides the benefit that magnetic saturation of the ferrimagnetic structure 520 is less likely and/or more difficult to achieve for a given current circulating in any of the first, second or third couplers 502/504/506. An additional benefit of utilizing interleaved ferrite strips in the ferrimagnetic structure 520 is that the ferrimagnetic structure 520 (e.g., the BAN 500) may be allowed to flex slightly without cracking or fracturing the ferrite of the ferrimagnetic structure 520.

However, the proposed ferrimagnetic structure 520 may have a slightly lower coupling between the first, second and third couplers 502/504/506 and the vehicle coupler (e.g., the vehicle coupler 406 of FIG. 4) than compared to a solid, non-interleaved, non-gapped ferrimagnetic structure. For this reason, approximately 20% more Amp-turns may be required for a given setup in order to maintain the same output power (see TABLE 1 below). However, because there is an approximate 44% reduction in mutual coupling between the first and second couplers 502/504, the 20% reduction in coupling between the first and second couplers 502/504 and the vehicle coupler 406 still provides a collective improvement (e.g., net gain) in performance of the BAN system 500.

In some implementations, a conductive plate 524 (e.g., aluminum) may also be disposed in the gap 522 to further reduce magnetic flux, and so mutual coupling, between the first coupler 502 and the second coupler 504. In some implementations, the conductive plate 524 may be disposed substantially perpendicular to the direction of the extension of the interleaved ferrite strips. In some implementations, a coefficient of mutual coupling between the first and second couplers 502/504 may be reduced from the previously described value of approximately 0.103 where interleaved ferrite strips having the gap are utilized but the conductive plate 524 is not utilized, to a value of 0.080 where the conductive plate 524 is utilized (a reduction of approximately 22%). However, since the level of magnetic flux in the gap 522 is already relatively low, it is estimated that only approximately 5 watts of power may be dissipated in the conductive plate 524 due to eddy currents induced by the magnetic flux passing through the conductive plate 524. TABLE 1 summarizes the mutual coupling coefficient between the first and second couplers 502/504, the number of Amp-turns required to transfer 10 kilowatts of power, the peak flux density in the ferrimagnetic structure 520, and the volume of ferrite utilized for each of an arrangement utilizing solid, non-interleaved non-gapped ferrite strips, an arrangement utilizing the interleaved, gapped ferrite strips as described above, and an arrangement further including the conductive plate 524.

TABLE 1

| Parameter | Solid Ferrite Strips | Interleaved Ferrite Strips | Interleaved Ferrite Strips with conductive plate |
|---|---|---|---|
| Coupling coefficient | 0.18 | 0.10 | 0.08 |
| Amp-turns | 250 | 300 (250 + 20%) | 300 (250 + 20%) |
| Peak flux density (mT) | 32 | 22 | 22 |
| Volume of ferrite (cm$^3$) | 7168 | 7813 | 7813 |

Figure 6:
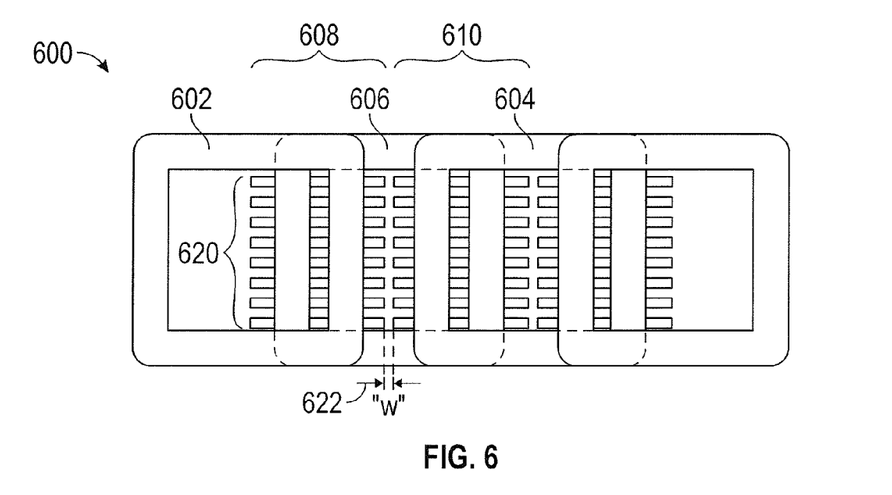
FIG. 6 shows a base array network (BAN) for transmitting power wirelessly, in accordance with another exemplary implementation.

The implementation of FIG. 5 is not the only implementation contemplated. For example, FIGS. 6-8 disclose at least some additional implementations. FIG. 6 shows a base array network (BAN) 600 for transmitting power wirelessly, in accordance with another exemplary implementation. The BAN 600 may correspond to any of the BANs 460a-460c, as previously described in connection with FIG. 4. The BAN 600 may comprise a first coupler 602 and a second coupler 604 adjacent to but not overlapping the first coupler 602. The BAN 600 additionally comprises a third coupler 606 overlapping at least a portion of the first coupler 602, although FIG. 6 shows the third coupler 606 also overlapping at least a portion of the second coupler 604. The third coupler 606 may be positioned to be mutually decoupled from each of the first and second couplers 602/604. In order to further reduce any mutual coupling between the first and second couplers 602/604, a specially designed ferrimagnetic structure 620 may be disposed beneath or adjacent to the first and second couplers 602/604 in order to reduce a flow of magnetic flux between a first portion 608 and a second portion 610 of the ferrimagnetic structure 620.

The ferrimagnetic structure 620 may include the first portion 608 disposed substantially under the first coupler 602 and the second portion 610 disposed substantially under the second coupler 604. As shown in FIG. 6, a gap 622 may be defined in the ferrimagnetic structure 620 between the first coupler 602 and the second coupler 604 (e.g., physically separating the first portion 608 from the second portion 610 of the ferrimagnetic structure 620). The gap 622 may have a width "w." However, unlike the implementation shown in FIG. 5, the ferrite strips that comprise the first and second portions 608/610 are not interleaved. Instead, the ferrite strips may be spaced from adjacent ferrite strips by a predetermined distance in a direction perpendicular to the gap 622 as well as to the direction of extension of the ferrite strips.

Figure 7:
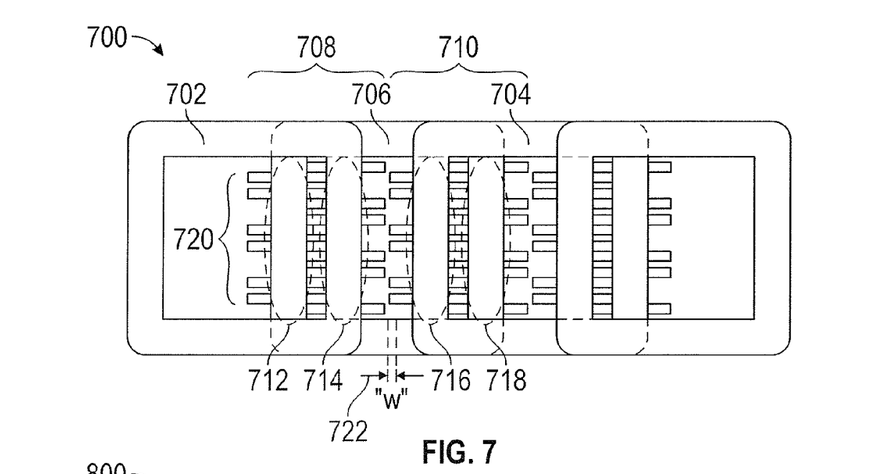
FIG. 7 shows a base array network (BAN) for transmitting power wirelessly, in accordance with yet another implementation.

FIG. 7 shows a base array network (BAN) 700 for transmitting power wirelessly, in accordance with another exemplary implementation. The BAN 700 may correspond to any of the BANs 460a-460c, as previously described in connection with FIG. 4. The BAN 700 may comprise a first coupler 702 and a second coupler 704 adjacent to but not overlapping the first coupler 702. The BAN 700 additionally comprises a third coupler 706 overlapping at least a portion of the first coupler 702, although FIG. 7 shows the third coupler 706 also overlapping at least a portion of the second coupler 704. The third coupler 706 may be positioned to be mutually decoupled from each of the first and second couplers 702/704. In order to further reduce any mutual coupling between the first and second couplers 702/704, a specially designed ferrimagnetic structure 720 may be disposed beneath or adjacent to the first and second couplers 702/704 in order to reduce a flow of magnetic flux between a first portion 708 and a second portion 710 of the ferrimagnetic structure 720.

The ferrimagnetic structure 720 may include the first portion 708 disposed substantially under the first coupler 702 and the second portion 710 disposed substantially under the second coupler 704. As shown in FIG. 7, a gap 722 may be defined in the ferrimagnetic structure 720 between the first coupler 702 and the second coupler 704 (e.g., physically separating the first portion 708 from the second portion 710 of the ferrimagnetic structure 720). The gap 722 may have a width "w." Like the implementation shown in FIG. 5, the first and second portions 708/710 are internally interleaved. For example, a first plurality of ferrite strips 712 of the first portion 708 are interleaved with a second plurality of ferrite strips 714 of the first portion 708, two strips from each plurality at a time, in contrast to one strip from each plurality at a time as shown in FIG. 5. Likewise, a first plurality of ferrite strips 716 of the second portion 710 are interleaved with a second plurality of ferrite strips 718 of the second portion 710, two strips from each plurality at a time.

Figure 8:
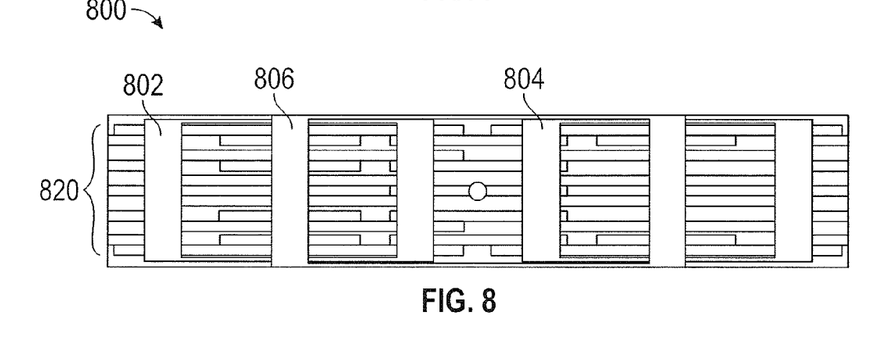
FIG. 8 shows a base array network (BAN) for transmitting power wirelessly, in accordance with yet another implementation.

FIG. 8 shows a base array network (BAN) 800 for transmitting power wirelessly, in accordance with another exemplary implementation. The BAN 800 may correspond to any of the BANs 460a-460c, as previously described in connection with FIG. 4. The BAN 800 may comprise a first coupler 802 and a second coupler 804 adjacent to but not overlapping the first coupler 802. The BAN 800 additionally comprises a third coupler 806 overlapping at least a portion of the first coupler 802, although FIG. 8 shows the third coupler 806 also overlapping at least a portion of the second coupler 804. The third coupler 806 may be positioned to be mutually decoupled from each of the first and second couplers 802/804. In order to further reduce any mutual coupling between the first and second couplers 802/804, a specially designed ferrimagnetic structure 820 may be disposed beneath or adjacent to the first and second couplers 802/804.

The ferrimagnetic structure 820 may comprise a plurality of ferrite strips. The ferrite strips may be interleaved under at least some portions of the first and second couplers 802/806 and may not be interleaved in at least a portion of the ferrimagnetic structure disposed between the first and second couplers 802/804. However, the implementation shown in FIG. 8 may not have any gap fully extending in the vertical direction of FIG. 8 down across each of the plurality of ferrite strips.

Figure 9A:
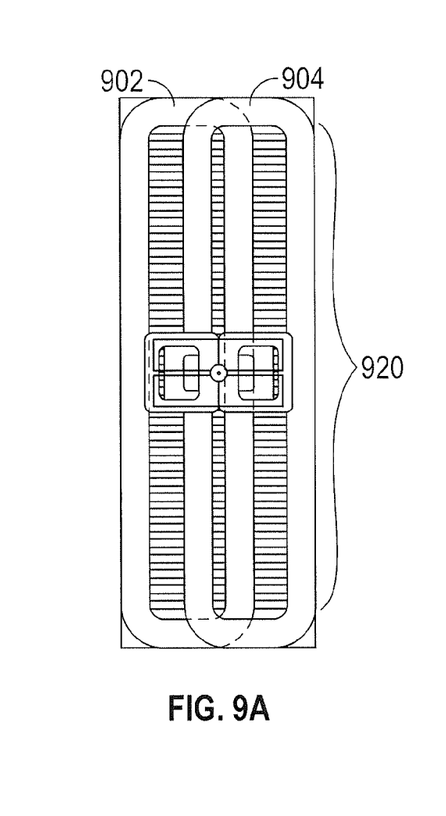
FIG. 9A shows a conventional bipolar arrangement for transmitting power wirelessly.

Ferrimagnetic structures similar to those previously described in connection with FIGS. 5-8 may additionally be utilized for bipolar pad arrangements, as will be described in connection with FIGS. 9A-9E below. FIG. 9A shows a conventional bipolar arrangement for transmitting power wirelessly. As shown in FIG. 9A, a first coupler 902 may be disposed adjacent to and overlapped by a second coupler 904. The amount of overlap between the first and second couplers 902/904 is conventionally strictly defined to ensure the couplers are decoupled. However, such restrictions may not result in the ideal geometry for transferring power to a vehicle coupler (e.g., the vehicle coupler 406 of FIG. 4) that is not centered over the first and second couplers 902/904. Generally speaking, the first and second couplers 902/904 being placed closer together (e.g., a larger amount of overlap) increases power transferred to a properly centered vehicle coupler, though power transfer drops off quickly as the vehicle coupler is farther and farther offset from center. This causes a large variation in base pad drive current as the vehicle coupler moves with respect to the bipolar coupler arrangement.

As further shown in FIG. 9A, a ferrimagnetic structure 920 may comprise a plurality of ferrite strips spaced from one another by a predetermined distance and having a length equal to or greater than the width of the first and second couplers 902/904. However, there is no gap defined to separate portions of the ferrimagnetic structure 920 under the first coupler 902 from portions of the ferrimagnetic structure 920 under the second coupler 904.

Figure 9B:
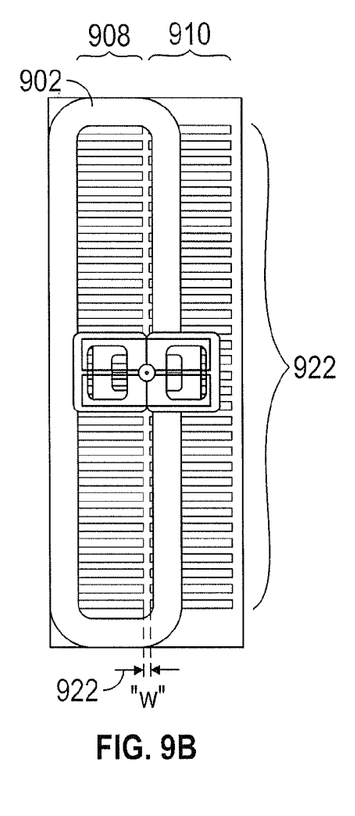
FIG. 9B shows a bipolar arrangement for transmitting power wirelessly, in accordance with an implementation.

FIG. 9B shows a bipolar arrangement for transmitting power wirelessly, in accordance with an implementation. As shown in FIG. 9B, the first coupler 902 may be disposed adjacent to and overlapped by the second coupler 904 (not shown for ease of viewing the gap 922) by a predetermined distance. A ferrimagnetic structure 922 may comprise a first portion 908 located substantially under the first coupler 902 and a second portion 910 located substantially under the second coupler 904. Each of the first and second portions 908 and 910 comprise a plurality of ferrite strips spaced from one another by a predetermined distance. The first portion 908 is separated from the second portion 910 by a gap 922 having a width "w", and having similar or substantially the same function for the ferrimagnetic structure 922 as previously described in connection with FIGS. 5-7.

Figure 9C:
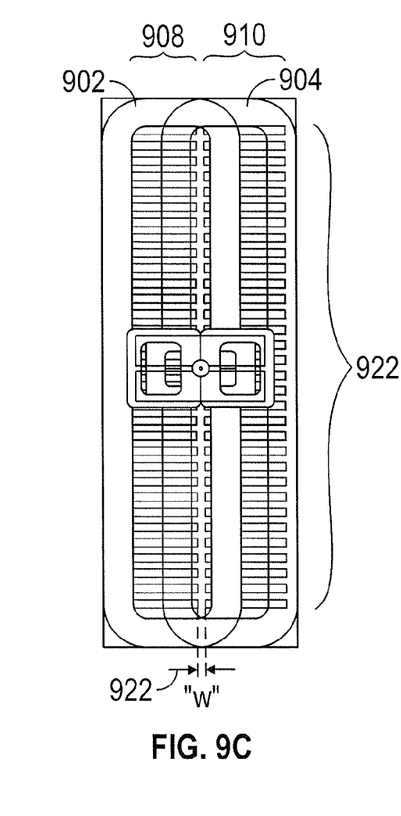
FIG. 9C shows a bipolar arrangement for transmitting power wirelessly, in accordance with another implementation.

FIG. 9C shows a bipolar arrangement for transmitting power wirelessly, in accordance with another implementation. As shown in FIG. 9C, the first coupler 902 may be disposed adjacent to and overlapped by the second coupler 904 by a predetermined distance greater than that shown in FIG. 9B. The ferrimagnetic structure 922 may be as previously described in connection with FIG. 9B.

Figure 9D:
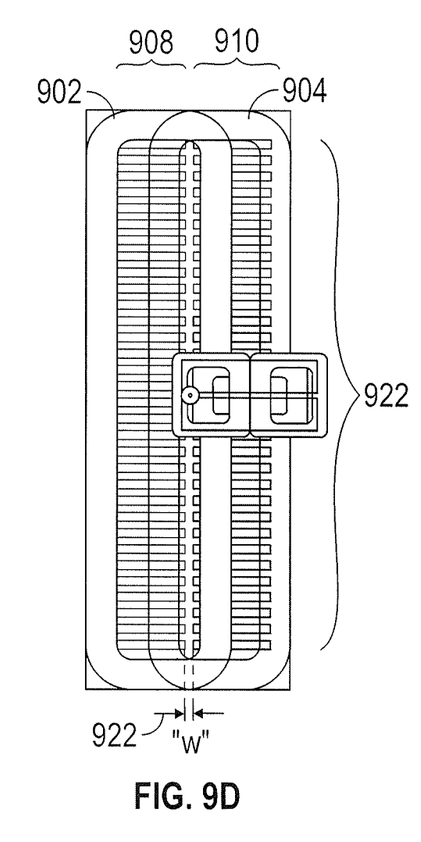
FIG. 9D shows a bipolar arrangement for transmitting power wirelessly, in accordance with yet another implementation.

FIG. 9D shows a bipolar arrangement for transmitting power wirelessly, in accordance with another implementation. As shown in FIG. 9D, the first coupler 902 may be disposed adjacent to and overlapped by the second coupler 904 by a predetermined distance greater than that shown in FIG. 9C. The ferrimagnetic structure 922 may be as previously described in connection with FIG. 9B.

Figure 9E:
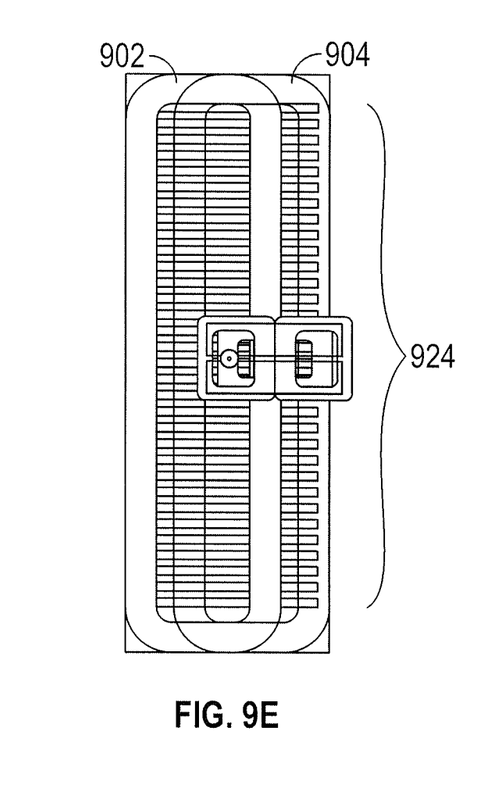
FIG. 9E shows a bipolar arrangement for transmitting power wirelessly, in accordance with yet another implementation.

FIG. 9E shows a bipolar arrangement for transmitting power wirelessly, in accordance with another implementation. As shown in FIG. 9E, the first coupler 902 may be disposed adjacent to and overlapped by the second coupler 904 by a predetermined distance. FIG. 9E further shows a ferrimagnetic structure 924 similar to that shown in FIG. 9A except that each of the plurality of ferrite strips are shortened with respect to those of FIG. 9A such that each of the plurality of ferrite strips are shortened and do not extend the from the outside edge of the first coupler 902 to the opposite outside edge of the second coupler 904.

In some implementations, the first and second couplers 902/904 as shown in any of FIGS. 9B-9E may be positioned so as to minimize any variation in drive current into one or both of the first and second couplers 902/904. In some implementations, increasing the overlap of the first and second couplers 902/904 may reduce the coupling between the couplers and a substantially aligned vehicle coupler. The ferrimagnetic structures 922/924 may then be adjusted to ensure that the first and second couplers 902/904 are substantially mutually decoupled.

TABLE 2 illustrates example measurements for certain characteristics including number of amp-turns required to deliver 10 kilowatts of power at zero lateral (e.g., y-axis) offset from the respective coupler implementations, the maximum number of amp-turns to deliver 10 kilowatts of power at any lateral offset, and the percentage change between these values for each of the implementations shown in FIGS. 9A-9E.

TABLE 2

| Design | Amp-Turns for Offset = 0 | Maximum Amp-Turns | % Change | |
|---|---|---|---|---|
| FIG. 9A | 142 | 229 | 62 | Full length ferrite strips |
| FIG. 9B | 225 | 329 | 46 | Gapped ferrite strips |
| FIG. 9C | 209 | 301 | 44 | Gapped ferrite strips |
| FIG. 9D | 218 | 311 | 43 | Gapped ferrite strips |
| FIG. 9E | 170 | 257 | 52 | Shortened ferrite strips |

Figure 10:
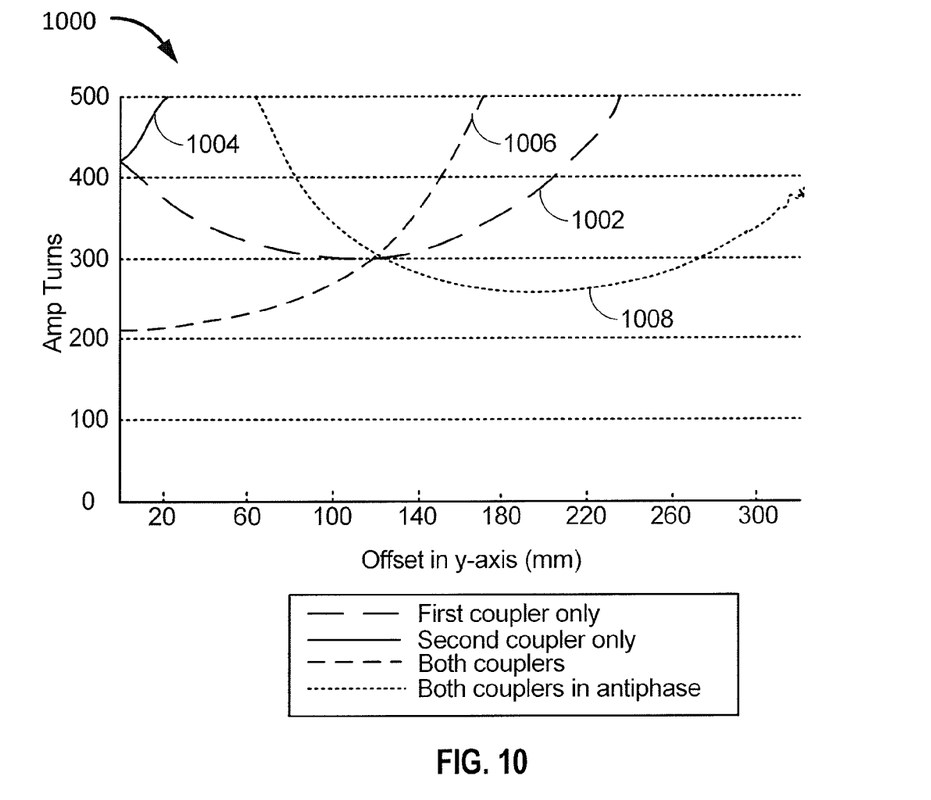
FIG. 10 is a chart illustrating the number of amp-turns versus y-axis offset of the bipolar arrangement of FIG. 9A to wirelessly transmit a predetermined amount of power.

FIG. 10 is a chart 1000 illustrating the number of amp-turns versus y-axis offset of the bipolar arrangement of FIG. 9A to wirelessly transmit a predetermined amount of power. As shown in FIG. 10, the chart 1000 includes a plot of number of amp-turns on the y-axis required to transfer 10 kilowatts of power to a vehicle coupler offset from the center of the bipolar arrangement of FIG. 9A the distance in mm shown on the x-axis when only the first coupler 902 is driven 1002, when only the second coupler is 904 is driven 1004, when both the first and second couplers 902/904 are driven in phase with one another 1006, and when both the first and second couplers 902/904 are driven in antiphase with one another 1008. The center of the arrangement may be considered the position midway between the overlapping portions of the first and second couplers 902/904 in the horizontal direction of FIG. 10. Of course, lower numbers of amp-turns are desired, however, the range (e.g., offset for which the number of amp-turns remain relatively low) has a significant effect on real world feasibility and usability.

Thus, some peak number of amp turns determines the maximum y-offset suitable for that particular coupler driving arrangement. For example, as shown, the plot 1002 begins at about 420 amp turns at zero offset, decreases to about 300 amp turns at about 120 mm offset, and increases beyond 500 amp turns outside approximately 220 mm offset. The plot 1004 begins at about 420 amp turns at zero offset and increases for any offset. The plot 1006 begins at about 210 amp turns at zero offset and increases to over 500 by an offset of approximately 170 mm offset. The plot 1008 does not drop below 500 amp turns until an offset of 60 mm, decreases to 260 amp turns at about 200 mm offset and increases back to about 380 amp turns by about 320 mm offset.

In some implementations, the coupler combination requiring the least number of amp turns for a given y offset range may be utilized to wirelessly transfer power. For example, in the present example, both couplers 902/904 may be driven in phase from a zero offset to an offset of about 120 mm (see plot 1006), then both couplers 902/904 may be driven in antiphase for offsets greater than 120 mm (see plot 1008). Of course, the precise numbers of this example are dependent upon the degree of offset and the dimensions of the two couplers 902/904.

Figure 11:
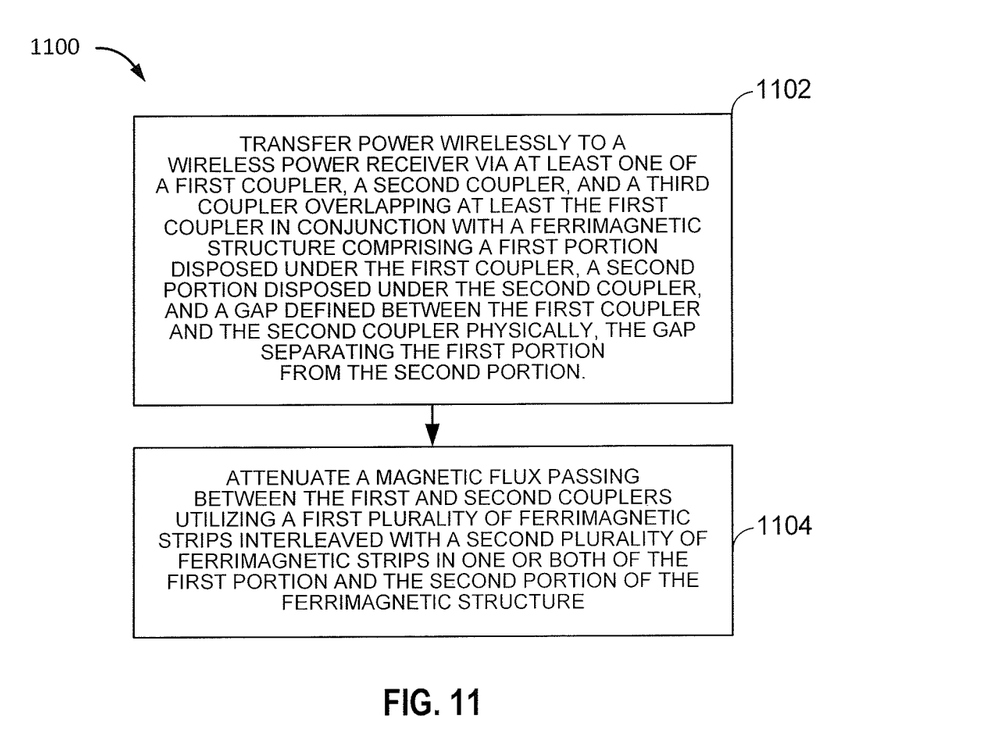
FIG. 11 is a flowchart depicting a method for wirelessly transferring power, in accordance with an exemplary implementation.

FIG. 11 is a flowchart 1100 depicting a method for wirelessly transferring power, in accordance with an exemplary implementation. The method of flowchart 1100 is described herein with reference to the wireless power transfer apparatuses as previously described in connection with FIGS. 5-9E. In an implementation, one or more of the blocks in flowchart 1100 may be performed by a controller such as, for example, one of the local controllers 425a-425f as previously described in connection with FIG. 4. Although the method of flowchart 1100 is described herein with reference to a particular order, in various implementations, blocks herein may be performed in a different order, or omitted, and additional blocks may be added. In some implementations, the flowchart 1100 may apply as the vehicle (e.g., the vehicle 405 of FIG. 4) travels along the roadway 411 having the wireless power transfer system 400 installed therein.

The flowchart 1100 may start with block 1102, which includes transferring power wirelessly to a wireless power receiver via at least one of a first coupler, a second coupler, and a third coupler overlapping at least the first coupler in conjunction with a ferrimagnetic structure comprising a first portion disposed under the first coupler, a second portion disposed under the second coupler, and a gap defined between the first coupler and the second coupler, the gap physically separating the first portion from the second portion.

In some implementations, the flowchart 1100 may then advance to block 1104, which includes attenuating a magnetic flux passing between the first and second couplers utilizing a first plurality of ferrimagnetic strips interleaved with a second plurality of ferrimagnetic strips in one or both of the first portion and the second portion of the ferrimagnetic structure.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features have been described herein. It is to be understood that not necessarily all such advantages may be achieved in accordance with any particular implementation. Thus, one or more implementations achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus for wirelessly transferring power, the apparatus comprising:
   a first coupler;
   a second coupler;
   a third coupler overlapping at least the first coupler; and
   a ferrimagnetic structure comprising a first portion disposed under the first coupler, a second portion disposed under the second coupler, and a gap defined between the first coupler and the second coupler, the gap physically separating the first portion from the second portion in a direction parallel to a width of the gap to attenuate a magnetic flux passing between the first and second couplers.

2. The apparatus of claim 1, wherein one or both of the first portion and the second portion comprises a first plurality of ferrimagnetic strips interleaved with a second plurality of ferrimagnetic strips.

3. The apparatus of claim 2, wherein each strip of the first plurality of ferrimagnetic strips is alternately interleaved with a respective one of the second plurality of ferrimagnetic strips.

4. The apparatus of claim 2, wherein two or more strips of the first plurality of ferrimagnetic strips are alternately interleaved with two or more respective strips of the second plurality of ferrimagnetic strips.

5. The apparatus of claim 2, wherein the first plurality of ferrimagnetic strips are interleaved with the second plurality of ferrimagnetic strips under at least a portion of the first coupler that is overlapped by the third coupler.

6. The apparatus of claim 2, wherein the ferrimagnetic strips of the first portion are offset from ferrimagnetic strips of the second portion in a direction perpendicular to the width of the gap to maximize a distance between the ferrimagnetic strips of the first portion and the ferrimagnetic strips of the second portion.

7. The apparatus of claim 1, further comprising a conductive plate disposed in the gap between the first coupler and the second coupler.

8. The apparatus of claim 1, wherein the first and third couplers are positioned to minimize a variation in drive current to the first and third couplers.

9. The apparatus of claim 1, further comprising a drive circuit configured to provide a drive current to at least one of the first, second and third couplers based on a position of a wireless power receiver.

10. A method for wirelessly transferring power, comprising:
    transferring power wirelessly to a wireless power receiver via at least one of a first coupler, a second coupler, and a third coupler overlapping at least the first coupler in conjunction with a ferrimagnetic structure comprising a first portion disposed under the first coupler, a second portion disposed under the second coupler, and a gap defined between the first coupler and the second coupler, the gap physically separating the first portion from the second portion in a direction parallel to a width of the gap to attenuate a magnetic flux passing between the first and second couplers.

11. The method of claim 10, wherein a first plurality of ferrimagnetic strips are interleaved with a second plurality of ferrimagnetic strips in one or both of the first portion and the second portion of the ferrimagnetic structure.

12. The method of claim 11, wherein each strip of the first plurality of ferrimagnetic strips is alternately interleaved with a respective one of the second plurality of ferrimagnetic strips.

13. The method of claim 11, wherein two or more strips of the first plurality of ferrimagnetic strips are alternately interleaved with two or more respective strips of the second plurality of ferrimagnetic strips.

14. The method of claim 11, wherein the first plurality of ferrimagnetic strips are interleaved with the second plurality of ferrimagnetic strips under at least a portion of the first coupler that is overlapped by the third coupler.

15. The method of claim 11, wherein the ferrimagnetic strips of the first portion are offset from the ferrimagnetic strips of the second portion in a direction perpendicular to the width of the gap to maximize a distance between the ferrimagnetic strips of the first portion and the ferrimagnetic strips of the second portion.

16. The method of claim 10, further comprising a conductive plate disposed in the gap between the first coupler and the second coupler.

17. The method of claim 10, further comprising minimizing a variation in drive current to the first and third couplers.

18. The method of claim 10, further comprising providing a drive current to at least one of the first, second and third couplers based on a position of a wireless power receiver.

19. A non-transitory computer-readable medium comprising code that, when executed, causes an apparatus to:
    transfer power wirelessly to a wireless power receiver via at least one of a first coupler, a second coupler, and a third coupler overlapping at least the first coupler in conjunction with a ferrimagnetic structure comprising a first portion disposed under the first coupler, a second portion disposed under the second coupler, and a gap defined between the first coupler and the second coupler, the gap physically separating the first portion from the second portion in a direction parallel to a width of the gap to attenuate a magnetic flux passing between the first and second couplers.

20. The medium of claim 19, wherein a first plurality of ferrimagnetic strips are interleaved with a second plurality of ferrimagnetic strips in one or both of the first portion and the second portion of the ferrimagnetic structure.

21. The medium of claim 20, wherein each strip of the first plurality of ferrimagnetic strips is alternately interleaved with a respective one of the second plurality of ferrimagnetic strips.

22. The medium of claim 20, wherein two or more strips of the first plurality of ferrimagnetic strips are alternately interleaved with two or more respective strips of the second plurality of ferrimagnetic strips.

23. The medium of claim 20, wherein the first plurality of ferrimagnetic strips are interleaved with the second plurality of ferrimagnetic strips under at least a portion of the first coupler that is overlapped by the third coupler.

24. The medium of claim 20, wherein the ferrimagnetic strips of the first portion are offset from the ferrimagnetic strips of the second portion in a direction perpendicular to the width of the gap to maximize a distance between the ferrimagnetic strips of the first portion and the ferrimagnetic strips of the second portion.

25. The medium of claim 19, further comprising a conductive plate disposed in the gap between the first coupler and the second coupler.

26. The medium of claim 19, wherein the code, when executed, further causes the apparatus to minimize a variation in drive current to the first and third couplers.

27. The medium of claim 19, wherein the code, when executed, further causes the apparatus to provide a drive current to at least one of the first, second and third couplers based on a position of a wireless power receiver.

28. An apparatus for wirelessly transferring power, the apparatus comprising:
   first means for wirelessly transferring power to a wireless power receiver;
   second means for wirelessly transferring power to the wireless power receiver;
   third means for wirelessly transferring power to the wireless power receiver, the third means overlapping at least the first means; and
   means for channeling magnetic flux between the first and second means comprising a first portion disposed under the first means, a second portion disposed under the second means, and a gap defined between the first means and the second means, the gap physically separating the first portion from the second portion in a direction parallel to a width of the gap.

29. The apparatus of claim 28, wherein one or both of the first portion and the second portion comprises a first plurality of ferrimagnetic strips interleaved with a second plurality of ferrimagnetic strips.

30. The apparatus of claim 29, wherein the first plurality of ferrimagnetic strips are interleaved with the second plurality of ferrimagnetic strips under at least a portion of the first means that is overlapped by the third means.

* * * * *